March 26, 1968 W. O. NICCOLLS 3,375,374
PHOTO-ELECTRIC RING OSCILLATOR CIRCUIT WITH VOLTAGE DOUBLER
Filed Sept. 24, 1965
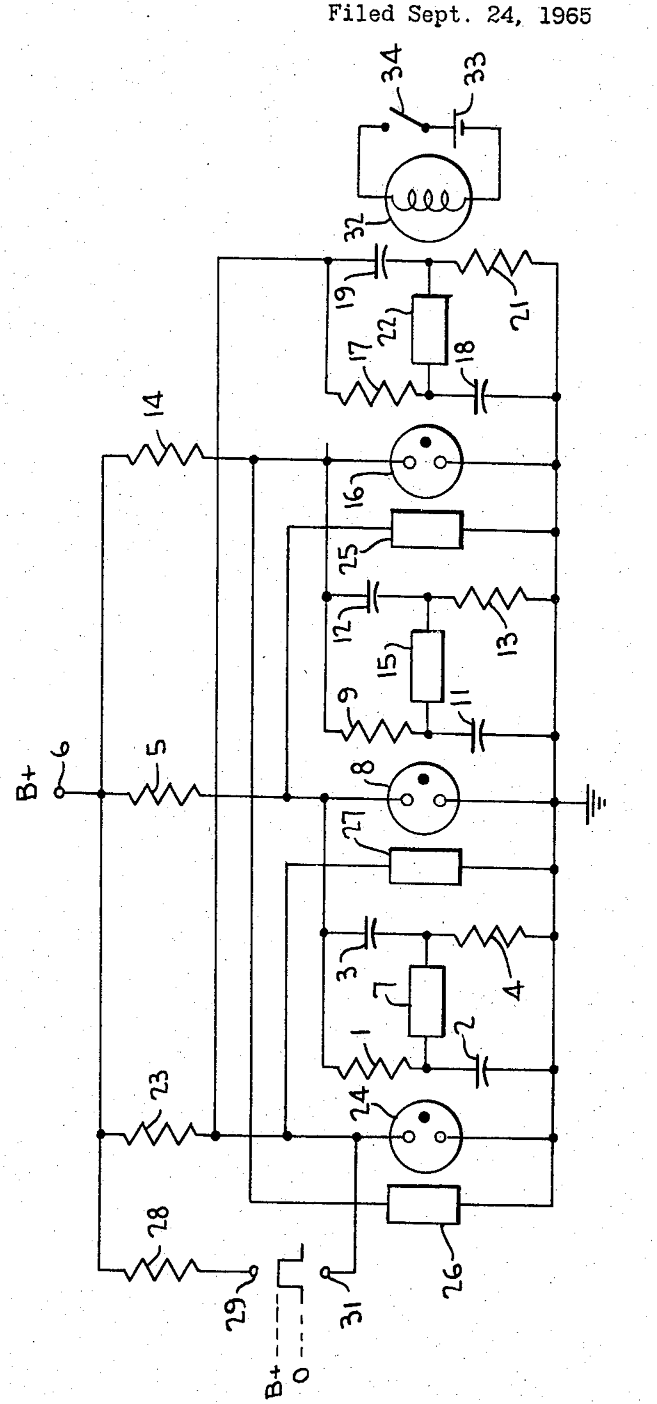
INVENTOR,
WESLEY O. NICCOLLS
BY Harry M. Saragovitz
Edward J. Kelly, Herbert Berl
& Charles S. Whitham
ATTORNEYS United States Patent Office 3,375,374
Patented Mar. 26, 1968

3,375,374

PHOTO-ELECTRIC RING OSCILLATOR CIRCUIT WITH VOLTAGE DOUBLER

Wesley O. Niccolls, 7015 Centreville Road, Manassas, Va. 22110

Filed Sept. 24, 1965, Ser. No. 490,141
3 Claims. (Cl. 250—209)

ABSTRACT OF THE DISCLOSURE

A photo-electric oscillator comprising a number of identical stages connected in a ring, the output of each stage being connected to the input of the next stage. Each stage includes a resistance-capacitance-charging circuit, a light source and a photo-electric switch. The photo-electric switch is connected in the charging circuit in such a manner that, when the switch is caused to assume its low resistance state by light radiation from the light source in the preceding stage, the charging circuit becomes a voltage doubler. When this occurs, the voltage across the charging circuit exceeds the firing voltage of the light source connected to the charging circuit. The light radiated by the light source triggers the next succeeding stage in the oscillator, and the charging circuit discharges to the extinguishing voltage of the light source. An alternate embodiment includes another photo-electric switch placed across each light source and responsive to the light source in the next succeeding stage. When this photo-electric switch is actuated, it hastens the discharge of the light source to which it is connected making possible higher frequency operation.

The invention described herein may be manufactured and used by or for the Government of the United States of America for governmental purposes without the payment to me of any royalty thereon.

This invention relates generally to oscillator circuits, and more particularly to a photo-electric ring oscillator circuit.

Ring oscillator circuits have great application in many diverse fields of electronics. For example, when used as a counter, the ring oscillator can simply and reliably generate, encode or decode any desired binary code in computing and communication systems. When used in its basic function as an oscillator, the ring oscillator becomes an accurate timer in many complex systems such as automatic control and fuze systems. The ring oscillator also performs complex frequency divisions and, as a result, has considerable application in the electric organ art.

In recent years, considerable attention has been devoted to photo-electric circuitry. There are many appealing characteristics exhibited by this type of circuitry. In particular, the photo-electric switch has the desirable features of unilateral operation, low noise, and ease of isolation. In addition, photo-electric circuits are simpler, more dependable, and cheaper to manufacture than their vacuum tube or transistor counterparts. Further, when used in counter and timing circuits, visible readout is provided without additional components or elements.

It is therefore an object of the present invention to provide an improved ring oscillator circuit which employs photo-electric circuitry and is characterized by improved and highly dependable operation and is at the same time inexpensive to build.

It is another object of this invention to provide a photo-electric ring oscillator circuit which employs a unique photo-electric switch in each stage of the oscillator which produces low-noise, dependable operation of the circuit.

According to the instant invention, the foregoing and other objects are attained by providing a resistance capacitance charging circuit which includes a photo-electric switch. The photo-electric switch is connected in the charging circuit in such a manner that, when the switch is caused to assume its low-resistance or high-conductivity state by light radiation from a preceding stage in the oscillator, the charging circuit becomes a voltage doubler. When this occurs the voltage across the charging circuit exceeds the firing voltage of a light source connected to the charging circuit. The light radiated by the light source triggers the next succeeding stage in the oscillator, and the charging circuit discharges to the extinguishing voltage of the light source.

The specific nature of the invention, as well as other objects, uses and advantages thereof, will clearly appear from the following description and from the accompanying drawings, in which:

The sole figure is a schematic diagram which illustrates the photo-electric ring oscillator according to the invention.

Referring now to the drawings, there is shown a voltage doubler charging circuit which comprises resistor 1 connected in series with capacitor 2 and capacitor 3 connected in series with resistor 4. Capacitor 2 and resistor 4 are connected in common to ground, while resistor 1 and capacitor 3 are connected in common through resistor 5 to a source of positive potential (B+) at terminal 6. The junction of resistor 1 with capacitor 2 is connected to the junction of capacitor 3 with resistor 4 through a photoconductive cell 7. The photo-conductive cell may be, for example, a cadmium selenide cell. A light source 8, which may be a neon gas tube, is connected across the voltage doubler charging circuit between the common junction of resistor 1 and capacitor 3 with resistor 5 and ground. When photo-conductive cell 7 is in its high resistance state, capacitor 2 charges through resistors 1 and 5 to a voltage approaching the voltage of the source of the positive voltage at terminal 6. Capacitor 3 also charges to a voltage approaching the source voltage through resistors 4 and 5. The source voltage (B+) is less than the firing voltage of the light source 8 but greater than one-half the firing voltage. As a result, light source 8 ordinarily remains in its quenched or extinguished state. When photoconductive cell 7 is irradiated with light from the preceding stage, it assumes its low resistance state and becomes highly conductive thereby effectively placing capacitors 2 and 3 in series. This causes the voltage across light source 8 to be approximately equal to twice the source voltage (2B+) or greater than the firing voltage of light source 8. The light source 8 fires and discharges capacitors 2 and 3 to its extinguishing voltage.

All other stages in the ring oscillator are identical with the stage just described. Thus, the next succeeding stage comprises a voltage doubler charging circuit having resistor 9 connected in series with capacitor 11 and capacitor 12 connected in series with resistor 13. Capacitor 11 and resistor 13 are connected to ground, and resistor 9 and capacitor 12 are connected through resistor 14 to the source of positive voltage at terminal 6. A photoconductive cell 15 connects the junction of resistor 9 with capacitor 11 to the junction of capacitor 12 with resistor 13. Light source 16 is connected across the voltage doubler charging circuit as before. Photo conductive cell 15 is in practice juxtaposed to light source 8 and isolated from other and stray light sources. A suitable arrangement which provides the desired isolation in a compact assembly is illustrated in FIGURE 2 of Patent No. 3,070,306 to DuBois for "Multiplying Circuit." Many other physical arrangements are known in the art and can, of course, be employed with equal effect.

Light radiated by light source 8 thus initiates the firing of light source 16 by switching photoconductive cell 15 to its low resistance state. This "domino"-type action continues through the ring oscillator from stage to succeeding stage until the last stage has been triggered. The output light radiation of the last stage is used to trigger the first stage, the first stage voltage doubler charging circuit having since recharged, and the process begins anew. In the circuit shown in the drawings, only three stages are shown; however, this is merely illustrative, and any number of stages may be used as required in any particular application. The last stage of the circuit illustrated comprises a voltage doubler charging circuit having resistors 17 and 21, capacitors 18 and 19, and photoconductive cell 22 connected as previously described, the charging circuit itself being connected to the source of positive voltage through resistor 23. Light source 24 is connected across the charging circuit and positioned adjacent photoconductive cell 7.

In some cases where, for example, higher frequency operation is desired, an additional photoconductive cell may be connected in shunt with the light source in each of the stages of the ring oscillator circuit. As shown in the drawings, photoconductive cell 25 is connected across light source 8, photoconductive cell 26 is connected across light source 16, and photoconductive cell 27 is connected across light source 24. Each shunting photoconductive cell is juxtaposed the light source of the next succeeding stage. Thus, photoconductive cell 25 shunting light source 8 is positioned adjacent light source 16. The effect of this circuit arrangement is to cause the light source in a particular stage to be extinguished as soon as the light source in the next succeeding stage has fired. For example, when light source 16 fires photoconductive cell 25 is switched to its low resistance state by radiation from light source 16. This causes the voltage across light source 8 to immediately drop below its extinguishing voltage. Capacitors 2 and 3 can then begin recharging sooner than if the radiation of light source 8 were self-extinguishing.

The operation of the ring oscillator circuit may be initiated mechanically, electrically or optically. To provide for mechanical initiation, a momentary contact switch (not shown) may be placed in parallel with photoconductive cell 22, for example. When the switch is momentarily closed, light source 24 will fire.

For electrical initiation, there is provided resistor 28 which is connected between terminal 6 and 29. Another terminal 31 is connected to the junction of light source 24 with resistor 23. To cause light source 24 to fire, a positive voltage pulse having an amplitude equal to the voltage (B+) at terminal 6 is impressed across terminal 29 and 31. This causes the voltage across light source 24 to be equal to twice the voltage at terminal 6 or greater than the firing voltage.

The optical initiation employs an additional light source 32 which may be an incandescent lamp connected in series with a battery 33 and a switch 34. Light source 32 is positioned adjacent photoconductive cell 22 and causes photoconductive cell to assume its low resistance or high conductive state when switch 34 is closed.

While only a three stage ring oscillator has been illustrated and described, it should be obvious to those skilled in the art that by using multiple photoconductive cells which are activated by a single light source in any particular stage signals may be tapped off at any desired point along the ring oscillator circuit for frequency division or logic circuit purposes. This also makes possible the operation of several ring oscillator circuits in parallel. Since there is no loading to a stage of the ring oscillator circuit, the limit to the number of photoconductive cells in any particular stage is determined by the physical size and sensitivity of the cells.

It will be apparent that the embodiments shown are only exemplary and that various modifications can be made in construction and arrangement within the scope of the invention as defined in the appended claims.

I claim as my invention:

1. A photo-electric ring oscillator circuit having a plurality of stages, each stage comprising:
   (a) a voltage doubler charging circuit having
      (1) a first resistance and a first capacitance connected in series,
      (2) a second resistance and a second capacitance connected in series, said series connected first resistance and first capacitance being connected in parallel with said series connected second resistance and second capacitance with said first resistance being connected to said second capacitance and said first capacitance being connected to said second resistance, and
      (3) a photoconductive cell connected between the junction of said first resistance with said first capacitance and the junction of said second resistance with said second capacitance,
   (b) a light source, and
   (c) a source of voltage having a value less than the firing voltage of said light source but greater than one-half the firing voltage of said light source connected to said voltage doubler charging circuit, said light source connected across said voltage doubler charging circuit, said photoconductive cell of each stage being physically positioned adjacent the light source in the next preceding stage whereby said photoconductive cell is caused to assume its low resistance state upon being irradiated by the light source in the next preceding stage thereby causing said first capacitance and said second capacitance to be connected in series which in turn causes the voltage across said light source to be raised above the firing voltage of said light source.

2. A photo-electric ring oscillator circuit as recited in claim 1 further comprising a second photoconductive cell in each stage connected in shunt with said light source, said second photoconductive cell being physically positioned adjacent the light source in the next succeeding stage whereby said second photoconductive cell is caused to assume its low resistance state upon being irradiated by the light source in the next succeeding stage thereby causing said second photoconductive cell to reduce the voltage across said light source to a value below the extinguishing voltage of said light source.

3. A photo-electric ring oscillator circuit as recited in claim 2 wherein said light source is a neon gas tube and said photoconductive cells are cadmium selenide cells.

References Cited

UNITED STATES PATENTS

| | | | |
|---|---|---|---|
| 3,185,850 | 5/1965 | Terlet | 250—209 |
| 3,213,283 | 10/1965 | Beeftink, et al. | 250—213 |
| 3,235,735 | 2/1966 | Blank | 250—213 |

RALPH G. NILSON, *Primary Examiner.*

M. ABRAMSON, *Assistant Examiner.*